United States Patent Office 3,468,836
Patented Sept. 23, 1969

3,468,836
THERMOSETTING COATINGS BASED ON HYDROXY COPOLYMER PARTIALLY CONDENSED WITH SILICON-CONTAINING MATERIAL CONTAINING AT LEAST 1.2 SILICON OH OR ALKOXY GROUPS IN COMBINATION WITH AMINOPLAST RESIN
Kazys Sekmakas, Chicago, Ill., assignor to De Soto, Inc., Chicago, Ill., a corporation of Delaware
No Drawing. Continuation-in-part of application Ser. No. 478,736, Aug. 10, 1965. This application Dec. 29, 1966, Ser. No. 605,607
Int. Cl. C08f 27/00; C08g 37/32
U.S. Cl. 260—33.6        12 Claims

ABSTRACT OF THE DISCLOSURE

Thermosetting organic solvent solution coating compositions possessing improved weathering and exposure characteristics are formulated to include an acrylic copolymer containing hydroxy functionality and this copolymer is partially condensed with a silicon-containing material such as a polysilanol or a polyalkoxy siloxane to provide a single phase resin which contains neutral hydroxy groups and acidic silicon-carried OH or alkoxy groups. The cure is effected with aminoplast resin which contains basic nitrogen-carried methylol groups. The cure is very rapid despite the high solvency of the condensate and the stability of the aminoplast resin blends.

---

The present application is a continuation-in-part of my prior copending application Ser. No. 478,736, filed Aug. 10, 1965, now abandoned.

The present invention relates to the provision of thermosetting coatings possessing improved weathering and exposure characteristics. Coatings of this character are of especial importance in the automotive field and in other similar applications in which long term exposure to the elements is intended.

In accordance with the present invention, an organic solvent solution coating composition is formulated to include in solution therein a combination of interacting resinous film-forming components including:

(1) An acrylic copolymer providing essentially neutral groups some of which have been reacted with an organo-silicon-containing material which provides a plurality of silicon-carried OH groups or alkoxy groups which, in use, generate the OH group in situ so that the copolymer also provides acidic OH groups carried by the silicon atom; and (2) An aminoplast resin such as an aminotrazine-formaldehyde condensate having basic hydroxy groups provided by methylol groups carried by the amino nitrogen atoms of the aminoplast resin.

The result is a room temperature-stable system which is capable of extensive cure upon baking. Apparently, the neutral hydroxy groups of the copolymer are reactive with the methylol groups of the aminoplast resin, this reaction proceeding at elevated temperature and being strongly catalyzed by the acidic silicon OH group. Similarly, and in the elevated temperature environment, the silicon OH groups become strongly reactive with the neutral copolymer hydroxy groups under the catalytic influence of the basic aminoplast resin. Also, and to conclude the extensive curing interaction, the acidic silicon OH groups are reactive with the basic methylol groups of the aminoplast resin.

It is to be especially noted that the neutral hydroxyl group is not viewed as the equivalent of the neutral epoxy groups because the epoxy group is more reactive (impairing room temperature stability) and because reaction of the epoxy group during the cure opens the oxirane ring generating a sluggishly reactive secondary hydroxyl group which is not completely consumed in the cure and which provides openings in the cured product for chemical attack. In contrast, the condensation reactions involving the hydroxy or alkoxy group in the invention (unlike the addition reactions involving the epoxy group) require the elimination of water or alcohol and do not proceed well at room temperature. At the same time, no reactive group is generated by the cure and the product is more chemically inert and, therefore, more resistant to weathering.

Referring first to the acrylic copolymer which is used in accordance with the invention, the copolymers which are required are addition copolymers of relatively low molecular weight so as to be highly soluble in conventional organic solvents and to be highly reactive as is needed in accordance with the invention. The most important component of the copolymer is the component providing the neutral hydroxy group which is preferably, but not necessarily, a primary hydroxy group. Thus, one can use any aliphatic monoethylenically unsaturated monomer containing the hydroxy group, or the hydroxy group may be generated in situ as by the reaction of a monoepoxide such as ethylene oxide or propylene oxide with carboxyl groups in the copolymer to form an hydroxy ester and thereby provide the hydroxy group. Where the hydroxy group is to be generated in situ by reaction with a preformed copolymer, it is preferred to employ the teachings of my prior copending application S.N. 229,743 filed Oct. 10, 1962, now U.S. Patent No. 3,250,734, which are incorporated herein by reference. When the hydroxy group is provided by copolymerization of an hydroxy-containing monomer, the preferred monomers are 2-hydroxy ethyl methacrylate and glycerol allyl ether, though these are merely illustrative of the class which also includes other hydroxy alkyl methacrylates and acrylates such as 2-hydroxy propyl methacrylate, 3-hydroxy propyl methacrylate, 4-hydroxy butyl methacrylate and 2-hydroxy ethyl acrylate. Still further hydroxy-containing monomers which may be used are ethylene glycol allyl ether, propylene glycol allyl ether, butylene glycol allyl ether, diethylene glycol allyl ether, trimethylol propane allyl ether and 2-hydroxy-methyl-5-norbornene (either the endo isomer or the exo isomer or mixtures thereof). Still further, allyl alcohol, methallyl alcohol, crotyl alcohol and unsaturated fatty alcohols corresponding to drying oil fatty acids may be used.

From the standpoint of proportions, the copolymer should contain from 3–30%, preferably from 5–15% of the hydroxyl supplying component, based on the weight of the copolymer. Where the hydroxy group is generated by an in situ reaction, one can still calculate the amount of the corresponding ethylenically unsaturated monomer which would provide the same hydroxyl content.

The balance of the copolymer consists essentially of monomers containing the $CH_2{=}C{<}$ group in order to provide a copolymer which is essentially linear and which contains the physical and chemical properties normally associated with acrylic polymers. This is in marked contrast with other resinous materials which may include hydroxy functionality, such as alkyd resins, but which do not possess properties adequate to provide the outstanding resistance to the elements which is desired in accordance with the invention.

Typical ethylenically unsaturated monomers useful in the formation of film-forming addition copolymers which are used in coating technology are a matter of common knowledge in the art. It is preferred in accordance with the invention to use combinations of monomers which form hard polymers, such as styrene, vinyl toluene, and methyl methacrylate, with monomers which form soft polymers, such as acrylate and methacrylate esters illustrated by ethyl acrylate, 2-ethylhexyl acrylate, butyl methacrylate and the like. Other monomers which may be included are illustrated by vinyl chloride, vinyl acetate, acrylonitrile, n-butyl vinyl ether, etc.

It will be observed that the monomers which have been noted to form the balance of the copolymer do not include functional groups which might interfere with the invention so that the hydroxy group provided by the hydroxy-containing component is essentially the only functional group in the copolymer prior to its reaction with the silicon component to be described hereinafter. On the other hand, a small proportion of carboxyl functionality is not harmful and may be present in an amount up to about 5% by weight of carboxyl-containing component in the copolymer. Momoners which may be used to supply the carboxyl group are acrylic acid, methacrylic acid, crotonic acid, monobutyl maleate, maleic acid and the like.

Interestingly, even such groups as N-methylol acrylamide are desirably absent since, when copolymers of appropriate cross-link density are formulated in accordance with the teachings of this invention modified to include a significant proportion of N-methylol acrylamide, the result is a system which is significantly slower curing and which, when finally cured to adequate solvent resistance, is significantly less flexible and resistant to impact forces.

Similarly, and while the invention is preferably illustrated by copolymers constituted exclusively by the addition copolymerization of monoethylenically unsaturated components, minor quantities of polyethylenically unsaturated components may be included in amounts up to about 10% of the weight of the copolymer, so long as the solubility of the copolymer is not unduly reduced or its physical and chemical properties unduly degraded.

The copolymers of the invention are desirably produced by a single stage solution copolymerization in which the monomers are dissolved in an organic solvent which is also a solvent for the copolymer which is formed and copolymerization is effected in the presence of a free-radical generating polymerization catalyst, elevated temperatures being normally used to speed the reaction.

Chain terminating agents, such as mercaptans, may be used to exert their known effect of lowered average molecular weight.

Any free-radical generating polymerization catalyst may be used, the selection of catalyst being determined by the desired temperature of the polymerization reaction. The important point is that the agent liberate free radicals under the conditions of polymerization so that the addition polymerization is facilitated. The class of catalysts under consideration is too well known to require extensive discussion, the examples illustrating suitable materials.

The particular nature of the organic solvent used for the solution copolymerization or for the solvent solution application which is later intended is not a critical aspect of the invention. Butanol, preferably in admixture with xylol, is a preferred solvent system, but the invention is not limited to specific solvents since many others are available and useful, such as toluene, methyl ethyl ketone, methyl isobutyl ketone, acetone, butyl acetate, 2-ethoxy ethanol, 2-butoxy ethanol, etc.

Broadly speaking, the silicon-containing material which is used in accordance with the invention may be hydroxy functional or alkoxy functional as indicated hereinbefore, these two classes of materials being similar from many standpoints. Thus, the silicon-containing material should contain an average of at least 1.2 silicon OH or alkoxy groups per molecule, and the functionality of the material is preferably higher. On the other hand, there are important aspects of non-equivalence since the fastest curing materials are the higher functional materials and the alkoxy group is helpful in enabling silicon-containing materials of the highest functionality to be fully incorporated by condensation without gelation. Accordingly, the OH-terminated materials and the alkoxy-terminated materials will be separately described, the OH-terminated materials being conveniently referred to as polysilanols.

The polysilanol component which is reacted with the hydroxy functional copolymer is a silicon-containing compound containing an average of at least 1.2 silicon OH groups per molecule, preferably about 2 silicon OH groups per molecule. The term silicon OH groups identifies compounds in which the OH groups are attached directly to silicon as in compounds of the formulae:

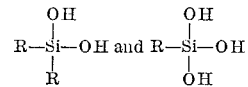

wherein R is an organic radical and preferably a hydrocarbon radical, such as an alkyl, alkenyl, cycloalkyl, aryl, alkaryl or aralkyl radical. These silanols are exemplified by diphenyldihydroxysilane, dicyclohexyldihydroxysilane, phenyltolydihydroxysilane, xylytrihydroxysilane, phenyltrihydroxysilane, octyltrihydroxysilane, vinyltrihydroxysilane, dimethyloctadecylhydroxysilane, myricyltrihydroxysilane, benzyldimethyldihydroxysilane, 3,3,3-trifluoropropylmethyldihydroxysilane, dibromophenylmethyldihydroxysilane, and chlorophenyltrihydroxysilane.

Another group of compounds containing a plurality of silicon OH groups are the siloxanols, i.e., compounds of the formula:

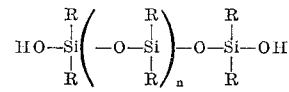

wherein R is an organic radical and preferably a hydrocarbon radical such as an alkyl, alkenyl, cycloalkyl, aryl, alkaryl, aralkyl radical, and $n$ is an integer from 0 to as high as 60 or more. Such materials may be exemplified by tetramethyldisiloxanediol

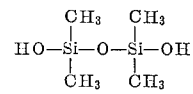

tetraphenyldisiloxanediol, tetraxylyldisiloxanediol, hexacyclohexyltrisiloxanediol, octaoctyltetrasiloxanediol, diphenyldimethyldisiloxanediol, dibutyldiethyldisiloxanediol and the like. Preferred members of this group comprise the organopolysiloxanediols, and particularly the polyalkylpolysiloxanediols, the polyarylpolysiloxanediols and the polycycloalkylpolysiloxanediols, which preferably contain no more than 12 carbon atoms in each aryl, alkyl or cycloalkyl radical.

Siloxanols which contain a plurality of silicon-bonded hydroxyl groups may be prepared by condensing one or more silanols. As is known, diorganosilanols condense to form entirely linear siloxanols, while monoorganosilanols form highly branched siloxanols. Mixtures of diorganosilanols and monoorganosilanols condense to form siloxanols having branching characteristics which lie between the above two extremes.

Another group of compounds containing a plurality of silicon OH groups are those having two or more silicon atoms bound together through divalent organic radicals, such as those of the formula

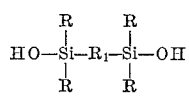

wherein R is another OH group or a hydrocarbon radical, preferably an alkyl, alkenyl, cycloalkyl, aryl, alkaryl or aralkyl radical, and $R_1$ is a divalent organic radical, such as methylene or polymethylene radical, arylene or polyarylene radical, cycloalkylene or polycycloalkylene radical, or aralkylene or polyaralkylene radicals, or oxaor thia-substituted derivatives of the foregoing members. Examples of this group include, among others, ethylene bis(trihydroxysilane), p-phenylene-bis(dimethylhydroxysilane), p-cyclohexylene-bis(dibutylhydroxysilane), 1,6-hexamethylene - bis(dimethylhydroxysilane), and 1,5-pentamethylene - bis(dibutylhydroxysilane). Particularly preferred members of this group comprise the alkylene-bis(dihydrocarbylhydroxysilanes), the arylene - bis(dihydrocarbylhydroxysilanes), and the cycloalkylene-bis(dihydrocarbylhydroxysilanes). The preparation of many of these preferred silicon-containing compounds is illustrated in U.S. Patent No. 2,561,429.

Still another group of compounds containing a plurality of silicon OH groups are the hydroxy-containing esters obtained by reacting any of the above-described silicon-containing polyhydric alcohols with mono- or polycarboxylic acids so that at least one of the OH groups remains unesterified. Preferred members of this group comprise those of the formula

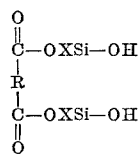

wherein R is a residue of polycarboxylic acids, such as phthalic acid, maleic acid, adipic acid, terephthalic acid, and the like, and X is the residue of the silicon-containing polyhydric alcohol as described above.

Referring to preferred polysilanols, it is pointed out that organo silanes hydrolyze to form organo silanetriols, for example.

$$RSiX_3 + 3H_2O \rightarrow RSi(OH)_3 + 3HX$$

The hydrolysis is promoted by the use of mineral acids as catalysts and by heating up to 100° C. The organo silanetriols thus formed polymerize by condensation either spontaneously or by further heating up to 180° C., to form a polyorgano-siloxane having the structural unit:

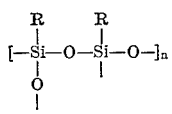

in which $n$ denotes the average number of recurring groups in the resinous molecule.

In the preferred embodiment of the invention, an intermediate is formed by stopping the condensation reaction before completion as by cooling or neutralization. The resinous intermediate so formed has the following average structural formula in which R'' indicates an organic group, which is desirably alkyl or aryl, but preferably phenyl:

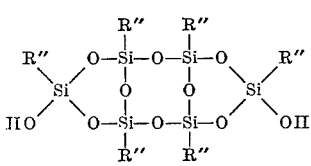

The specific hydroxy silicone resinous material having substantially the above structure in which R'' is phenyl and which is hereinafter referred to as disilanol "A" has the following physical characteristics:

Hydroxy content, percent _____ 3.9
Average molecular weight _____ 1,600
Combining weight (grams providing 1 gram
   mol of OH functionality) _____ 400

It should be noted that the disilanol "A" is self-evidently a material having an hydroxy functionality higher than 2 and a molecular weight higher than shown by the idealized formula. However, the term "disilanol" identifies the idealized structure and the ring opening or self-condensation which occurs in commerce accounts for the variation from the theoretical in molecular weight and hydroxy functionality. Also, and since combining weight is determined by esterification at elevated temperature with an organic acid (which leads to further ring opening and self-condensation), the combining weight does not necessarily compare exactly with the hydroxy content. Also, commercial products of the type noted above are available with an average molecular weight of 1200 and a combining weight of 425 and with hydroxy values of from 4-5%.

From the standpoint of alkoxy-functional materials, these may broadly correspond to any of the hydroxy functional materials which have been referred to hereinbefore, it being merely necessary to etherify the OH group with an alcohol in order to generate the alkoxy group. On this basis, it will be understood that alkoxy derivatives which correspond to each of the OH-terminated materials referred to previously can be utilized, and the etherification can be complete or partial so that the final silicon-containing compound may include mixtures of alkoxy groups and OH groups. However, when the compositions are later baked, the alcohol etherifying agent is eliminated which effectively regenerates the OH groups in situ. Moreover, and in a condensation reaction, it is possible to liberate alcohol more smoothly and controllably than water, and, for this reason, the alkoxy group is preferred when the higher functional silicon-containing materials are employed. Similarly, methyl alcohol is more easily removed than the higher alcohols and, accordingly, the methoxy group is preferred to the ethoxy or butoxy groups, though all of these are useful as are other etherifying alcohols and ether alcohols such as, 2-ethoxy ethanol and 2-butoxy ethanol.

The preferred silicon-containing materials are polysiloxanes, and it will be understood that both alkoxy and OH-containing polysiloxanes can be made in a similar fashion, e.g., by hydrolyzing an alkoxysilane such as phenyltriethoxysilane or dimethyldimethoxysilane.

Since the removal of water and alcohol can proceed at the same time, the hydrolysis of alkoxy silanes can produce siloxanes which contain both hydroxy and alkoxy functionality and polymeric alkoxy silane hydrolysates are available with detectable hydroxy and alkoxy contents. It is also possible to emphasize the alkoxy functionality of the hydrolysates by conducting the reaction in the presence of an etherifying alcohol.

Accordingly, and in line with conventional organopolysiloxanes identification, the preferred organopolysiloxanes have the following unit formula:

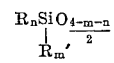

where R is a monovalent hydrocarbon radical, R' is selected from the group consisting of alkoxy radicals and the hydroxyl radical, $n$ has an average value of 1 to 2, and $m$ has an average value of at least 0.1, the sum of $m$ and $n$ being no more than 3, there being an average of at least 1.2 R' groups present per organopolysiloxane molecule.

In the above description the preferred value for $m$, is from 0.5 to 1.1 and the average number of R' groups per molecule does not exceed 10 and is preferably in the range of from 2–8.

Referring more particularly to the proportions which are used in accordance with the invention, the proportion of silicon-containing material is related to the hydroxy content of the copolymer. Since the silicon-containing material can vary widely in its molecular weight and functionality, it is more realistic to relate proportions on an equivalent basis. Accordingly, the equivalent ratio of copolymer hydroxy to silicon-carried OH or alkoxy can range from 1:4 to 4:1, preferably from 2.5:1 to 1:2.5. The silicon-containing material is then reacted with the hydroxy copolymer in order to form a condensate in which the bulk of the silicon-containing material has been incorporated into the copolymer with the condensate containing both unreacted hydroxy groups provided by the copolymer and unreacted acidic silicon OH or alkoxy groups carried by the residue of the silicon-containing material in the condensate. Again, the wide variation in the molecular weight and functionality of the silicon-containing material as well as the proportions used makes it difficult to identify the desired extent of reaction in a manner which embraces all of the different possibilities. On the other hand, one can broadly indicate that from 5–95% of the silicon-carried OH or alkoxy groups must be reacted, preferably from 10–90% (this being easily noted by measuring the water or alcohol eliminated during the reaction). The condensate should not be advanced to the point of gelation and the final condensate must include both unreacted copolymer OH groups and acidic silicon OH or alkoxy groups.

It is desirable in the condensation reaction to employ a catalyst which facilitates the reaction. Organic acids, such as naphthenic acid and organic titanates, such as tetrabutyl titanate, are useful for this purpose. The use of the catalyst is not essential, but it does facilitate the condensation reaction and is helpful.

One factor of particular interest in the present development is the capacity to advance the condensation reaction to a point close to gelation (which occurs rapidly when it does take place) without significantly reducing the solubility of the condensate in practical solvent systems such as those which contain a major weight proportion of aromatic hydrocarbon solvents such as toluene, xylene and homologs thereof or ester 2-ethoxy ethanol acetate. Thus, it is convenient to operate at rather high resin solids content of from 30–65%, conveniently at 50%, and though the condensate viscosity increases to rather significant values illustrated by a Gardner viscosity of V–$Z_4$, the solution remains clear and the product is stable. As a practical matter, one comes as close to gelation as possible as indicated by the devolpment of a tail on the bubble in the Gardner-Holdt viscosity tube. Despite the maintenance of extensive solubility as has been indicated, the product cures to solvent insolubility with great rapidity which is attributed, as previously indicated, to the combination of different functionalities which is relied upon.

As will be understood in the art, the closer one brings the system to the point of incipient gelation, the more practical is the system so long as the system is stable and retains the capacity for rapid cure in appropriate combination (in the present instance with the addition of aminoplast resin to provide the basic methoxy groups which complete the combination). Thus, it is preferred to continue the condensation of the silicone-containing material with the hydroxy functional copolymer until an average of at least one silicon OH or alkoxy group is condensed per molecule of silicone-containing material.

The proportion of condensate to aminoplast resin can vary widely, e.g., from 95:2 to 5:95 by weight, but it is preferred to combine a large weight proportion of the copolymer-silicon-containing material condensate with a small proportion of the aminoplast resin. In preferred practice, from 40 to 95 parts by weight of condensate are combined with from 60 to 5 parts of aminoplast resin, most preferably from 70–90 parts of the condensate are combined with 10–30 parts of the aminoplast resin.

Any solvent-soluble, heat-hardening aminoplast resin may be employed in accordance with the invention including urea-formaldehyde condensates, melamine-formaldehyde condensates and triazine-formaldehyde condensates. Broadly, any polyamine can be condensed with a stoichiometric excess of formaldehyde, preferably in the presence of an alcohol to insure solubility in organic solvents in order to provide the heat-hardening condensates which are desired. The condensation may be effected in either acidic or alkaline environment. In any event, a soluble resinous product is provided containing a plurality of basic methylol groups carried by the nitrogen atom of the polyamine.

It is desired to point out that the partial reaction which is had in accordance with the invention between the hydroxy copolymer and the silicon-containing materials is important in order that the weather resistance provided by the silicone component can be combined with the flexibility and impact resistance of the acrylic backbone of the copolymer. Also, this critical prereaction enables the silicon component to be more compatibly combined with the aminoplast component and it also functions to eliminate one component of a three component system, which greatly reduces problems of both compatibility and cure.

If desired, an acidic catalyst such as paratoluene sulfonic acid or mellitic acid may be included in the blend of condensate and aminoplast resin to catalyze the reaction. The amount of such a catalyst may be from 0.1% to 2% by weight, based on resin solids. The use of the catalyst is particularly desirable when lower temperatures of curing are desired, but it is not an essential of a practical coating system.

The organic solvent solution coating compositions may be applied as a coating on metals, wood, ceramics, brick and concrete surfaces to yield hard, flexible, glossy films which are superior to conventional acrylic or alkyd-amine resin coatings, not only in gloss and color retention, but in exterior durability and weatherability. They are particularly suitable for application where improved weatherability is required, such as finishing topcoats for automobiles.

These coatings can be applied in any desired fashion to the substrate to be coated such as by spraying, brushing, or roller coating. After application, the coatings are cured by baking utilizing the conventional temperatures used for the baking of thermosetting coating compositions which are well known in the coating field. Thus, temperatures of from 200–500° F. are applicable for periods of time of from about 30 seconds at the highest temperatures to about an hour at the lowest temperatures.

The invention is illustrated by the following examples:

EXAMPLE 1

PREPARATION OF ACRYLIC-POLYSILANOL CONDENSATE CONTAINING 40% POLYSILANOL

| | Parts by weight | Procedure of preparation |
| --- | --- | --- |
| Xylol | 500 | Charge into reactor equipped with an agitator, a reflux condenser, thermometer, and a nitrogen inlet tube. Heat to 280–290° F. |
| Monomer Blend "A" | 300 | |
| Monomer blend "A": | | |
| Methyl methacrylate | 720 | Premix monomers and catalyst and add over 1½ hours to reactor. |
| Butyl acrylate | 960 | |
| Hydroxyethyl acrylate | 280 | |
| Glacial methacrylic acid | 40 | |
| Tert-butyl perbenzoate | 20 | |
| | | Hold for one hour. |
| Tert-butyl perbenzoate | 6 | Add after one hour. Hold for 3–4 hours at reflux temperature. |
| Xylol | 2,647 | Add xylol. Cool to 260° F. |
| Disilanol "A" | 1,326 | Set Dean-Stark trap with xylol. Viscosity of resin: N (Gardner). Reheat to 280–290° F. and distill off water (33–34 cc.). Final viscosity: W. |
| Butanol | 100 | Heat off. Cool. Add 100 grams butanol to adjust viscosity. |

Final characteristics of acrylic-polysilanol condensate:

Solids (percent) _____ 50.3
Viscosity (Gardner) _____ U
Color (Gardner-Holdt) _____ 1

A gloss enamel is prepared consisting of 28% titanium dioxide rutile and 32% non-volatile resin provided by the solution product of Example 1. The non-volatile resin has the following composition:

| | Percent |
|---|---|
| Acrylic-polysilanol condensate | 68 |
| Butylated melamine resin [1] | 32 |

[1] The resin employed is a heat-hardenable solvent-soluble melamine-formaldehyde condensate etherified with butanol to provide solvent solubility and is employed in the form of a 55% by weight resin solids solution containing 25% butanol and 20% xylol. The melamine-formaldehyde resin is provided by heat reacting 5.5 mols of formaldehyde with 1 mol of melamine in the presence of excess butanol and a small amount of acid catalyst.

The enamel is ground in a pebble mill to obtain a 7½ N.S. grind gauge reading and films thereof are drawn on steel panels and baked for 15 minutes at 350° F.

The following results are obtained:

| | |
|---|---|
| Adhesion to metal | Excellent. |
| Pencil hardness | 2H. |
| Forward impact | Pass 30 inch/lbs. |
| Flexibility (conical mandrel) | Pass ¼". |
| Gloss (60°) | 91. |
| Toluol resistance | Excellent. |
| Recoat adhesion | Very good. |

EXAMPLE 2

PREPARATION OF ACRYLIC-POLYSILANOL CONDENSATE CONTAINING 25% POLYSILANOL

| | Parts by weight | Procedure of preparation |
|---|---|---|
| Xylol | 600 | Heat to reflux temperature (280–290° F.). |
| Monomer blend "A" | 300 | |
| Monomer blend "A": | | |
| Styrene | 920 | |
| 2-ethylhexyl acrylate | 800 | |
| Hydroxy ethyl acrylate | 240 | Premix and add over 1 hours at reflux temperature. |
| Glacial methacrylic acid | 40 | |
| Tertiary butyl perbenzoate | 20 | |
| | | Hold for 1 hour. |
| Tertiary butyl perbenzoate | 6 | Add additional catalyst. |
| Xylol | 1,940 | Hold for 3½ to 4 hours. |
| Disilanol "A" | 660 | Add xylol and disilanol. Viscosity (Gardner): U. Set trap with xylol. Heat to reflux temperature. Distill off water at 280–285° F. Distill off 16–17 cc. water. |
| Xylol | 120 | Add xylol to adjust solids. |

Final characteristics of acrylic-polysilanol condensate:

Solids (percent) _____ 51.1
Viscosity (Gardner) _____ X—
Color (Gardner-Holdt) _____ 1

The solution product of the present example is evaluated in a gloss enamel prepared as in Example 1. The following results are obtained:

| | |
|---|---|
| Adhesion to metal | Excellent. |
| Pencil hardness | 2H. |
| Forward impact | 20 inch/lbs. |
| Flexibility (conical mandrel) | Pass ⅛". |
| Gloss (60°) | 92. |
| Toluol resistance | Excellent. |
| Recoat adhesion | Very good. |

EXAMPLE 3

PART "A".—PREPARATION OF HYDROXY ACRYLIC COPOLYMER

| | Parts by weight | Procedure of preparation |
|---|---|---|
| 2-ethoxy ethanol acetate | 1,144 | Charge into reactor equipped with reflux condenser, agitator, nitrogen inlet tube and addition funnel. |
| Ethyl acrylate | 1,188 | |
| Styrene | 330 | |
| Methyl methacrylate | 440 | Premix and add over 2 hours at 260–270° F. Hold for 1 hour. |
| Hydroxyethyl acrylate | 220 | |
| Glacial methacrylate acid | 44 | |
| Ditertiary butyl peroxide | 22 | |
| Benzoyl perioxide | 11 | |
| Tert-butyl perbenzoate | 7 | Add. Hold for 2 hours. |
| Do | 4 | Do. |
| 2-ethoxy ethanol acetate | 340 | Add to adjust to 60% solids. |

Final characteristics of hydroxy polymer:

Solids (percent) _____ 61
Viscosity (Gardner) _____ $Z_4$
Color (Gardner-Holdt) _____ 1

PART "B".—PREPARATION OF ACRYLIC POLYMER POLYSILOXANE CONDENSATE BY CONDENSING 30% BY WEIGHT OF POLYMETHOXY SILOXANE ON THE HYDROXY ACRYLIC BACKBONE

| | Parts by weight | Procedure of preparation |
|---|---|---|
| Hydroxy terminated copolymer of Part "A" | 1,548 | Charge into reactor equipped with reflux condenser, agitator and Dean-Stark trap. Heat to 265–275° F. and distill off methanol (21 grams). The initial viscosity: J–K (Gardner). After separation of 21 grams of methanol. Final viscosity is X (Gardner). |
| 2-ethoxy ethanol acetate | 720 | |
| Dimethyltriphenyltrimethoxytrisiloxane hydrolysed with 31.4 parts of water per 1,000 parts of trisiloxane to provide an hydrolysate having a methoxy content of 10%, a molecular weight of 2,166 and a methoxy functionality of 7.0. | 405 | |
| Tert-butyl titanate | 1.2 | |
| Butanol (to adjust viscosity) | 75 | Add. |

Final characteristics of polysiloxane condensation product:

Solids (percent) _____ 50.2
Viscosity (Gardner) _____ U–V
Color (Gardner-Holdt) _____ 2–3
Degree of condensation, percent _____ 50

A high gloss enamel containing the condensate of this Example 3 was prepared using the following composition:

| | Percent |
|---|---|
| Titanium dioxide | 28 |
| Non-volatile resin | 32 |

Composition of non-volatile resin:

| | Percent |
|---|---|
| Condensate of Example 3 | 85 |
| Butylated melamine resin (see note 1 of Example 1) | 15 |

The enamel is drawn down on a chromate treated aluminum panel with a #38 wire wound rod and baked for 90 seconds at 475° F.

The following results are obtained:

| | |
|---|---|
| Gloss (Photovolt 60° reading) | 90. |
| Mar resistance | Very good. |
| Flow | Do. |
| Pencil hardness | H. |
| Reverse impact | Pass 30 inch/lbs. |
| Acetone resistance | Pass 50 rubs. |
| Adhesion to metal | Excellent. |

As the above results demonstrate, the coatings exhibit good flexibility, impact, adhesion and curing properties.

The condensate of Example 3 was then blended with 10% of the same butylated melamine formaldehyde resin and applied on an aluminum panel with a #38 wound wire rod. The film was baked for 45 seconds at 475° F.

The baked film was glossy, hard and adherent to the aluminum panel. It passed 50 acetone rubs, which is a good indication of an extremely fast cure since a 45 second bake is quite short.

EXAMPLE 4

PREPARATION OF ACRYLIC POLYMER POLYSILOXANE CONDENSATE BY CONDENSING 30% BY WEIGHT OF POLYETHOXY SILOXANE ON THE HYDROXY ACRYLIC BACKBONE

| | Parts by weight | Procedure of preparation |
|---|---|---|
| Hydroxy terminated Copolymer of Example 3, Part "A". | 516 | Charge into reactor. Set empty Dean-Stark trap. With agitation and nitrogen sparge heat to 270° F. Distill off ethanol 6–7 grams until viscosity will reach U–V reading. |
| 2-ethoxy ethanol acetate | 140 | |
| Polyethoxy siloxane obtained by the hydrolysis of diphenyl diethoxysilane in 60% xylene solution, the siloxane containing 5% ethoxy, having a molecular weight in the range 2,000 to 5,000, an hydroxy equivalent weight of 800 and a functionality of approximately 3. | 225 | |
| Tert-butyl titanate | 0.4 | |
| Butanol | 15 | Add. |

The final characteristics of silicone polymer:

Solids (percent) _____ 53.3
Viscosity (Gardner) _____ U+
Color (Gardner-Holdt) _____ 1–2

EXAMPLE 5

PART "A".—PREPARATION OF HYDROXY TERMINATED ACRYLIC COPOLYMER

| | Parts by weight | Procedure of preparation |
|---|---|---|
| 2-ethoxy ethanol acetate | 667 | Charge into reactor equipped with reflux condenser, agitator, nitrogen inlet tube and separatory addition funnel. |
| Ethyl acrylate | 570 | Premix and add over 2 hours at 260–270° F. Hold for 2 hours at 270° F. |
| Styrene | 50 | |
| 2-ethylhexyl acrylate | 50 | |
| Hydroxyethyl acrylate | 120 | |
| Methyl methacrylate | 190 | |
| Glacial methacrylic acid | 20 | |
| Ditertiary butyl peroxide | 15 | |
| Tert-butyl perbenzoate | 3 | Add. Hold for 2 hours. |
| Do | 2 | Do. |
| 2-ethoxy ethanol acetate | 340 | Add to 50% solids. |

Final characteristics of hydroxy polymer:

Solids (percent) _____ 50.2
Viscosity (Gardner) _____ V–
Color (Gardner-Holdt) _____ 1

PART "B".—PREPARATION OF CONDENSATE USING 10% OF A POLYMETHOXY SILOXANE

| | Parts by weight | Procedure of preparation |
|---|---|---|
| Hydroxy Terminated Copolymer of Part "A". | 1,060 | Charge into reactor. Set empty Dean-Stark trap. With agitation and nitrogen sparge heat to 270° F. Distill off methanol (7 grams). Hold for viscosity W–X. Cool to 190° F. |
| Dimethyltriphenyltrimethoxytrisiloxane hydrolysed with 16.4 parts of water per 1,000 parts of trisiloxane to provide an hydrolysate having a methoxy content of 15%, an approximate molecular weight of 750, and an hydroxy functionality of 3.66. | 59 | |
| 2-ethoxy ethanol acetate | 29 | |
| Tert-butyl titanate | 0.3 | |
| Butanol | 18 | Add. |

The final characteristics of the condensate:

Solids (percent) _____ 51.5
Viscosity (Gardner) _____ W–
Color (Gardner-Holdt) _____ 1
Degree of condensation, percent _____ 73

The condensate of this Example 5 was blended with 10% of butylated melamine formaldehyde resin (see note 1 of Example 1) and applied on an aluminum panel with a #38 wound wire rod. The film was baked for 45 seconds at 475° F. The baked film of the above condensate was glossy, hard and adherent. It passed 50 acetone rubs, which indicates an extremely fast cure.

EXAMPLE 6

Examples 1 and 2 were repeated utilizing a product of the Dow Corning Corporation identified as Z–6018 in place of the Disilanol "A" used in these examples. Comparable results are obtained in each instance.

EXAMPLE 7

Examples 3 and 5 were repeated utilizing a product of the Dow Corning Corporation identified as Sylkyd 50 in place of the dimethyltriphenyltrimethoxytrisiloxane used in these examples. Comparable results are obtained in each instance.

EXAMPLE 8

Example 4 was repeated utilizing a product of Union Carbide Corporation identified as XR–830 in place of the polyethoxy siloxane used in Example 4. Comparable results are obtained.

I claim:

1. A thermosetting coating composition comprising an organic solvent having dissolved therein:
   (1) a non-gelled condensate of a copolymer of from 3–30%, based on the weight of the copolymer, of aliphatic monoethylenically unsaturated monomer carrying the hydroxy group selected from the group consisting of hydroxy alkyl esters of monoethylenically unsaturated carboxylic acids, polyhydric alcohol allyl and methallyl ether, allyl and methallyl alcohols, 2-hydroxy-methyl-5-norbornene and unsaturated fatty alcohols corresponding to drying oil fatty acids, the balance of the copolymer consisting essentially of at least one monomer containing the

group with the hydroxy group provided by said monomer carrying the hydroxy group being essentially the only functional group in the copolymer, the sole exception being that said balance of the copolymer is of up to 5% by weight of monoethylenically unsaturated carboxylic acid, with a hydrocarbon-substituted polysiloxane containing an average of at least 1.2 silicon-bonded OH or alkoxy groups per molecule, the equivalent ratio of hydroxy groups in said copolymer to silicon-bonded OH or alkoxy groups in said polysiloxane being from 4:1 to 1:4, said condensation being continued to eliminate from 5–95% of the water or alcohol of reaction from the silicon-bonded OH or alkoxy groups in said polysiloxane to cause the bulk of said polysiloxane to become chemically combined with said copolymer and form a non-gelled condensate providing unreacted hydroxy groups in the copolymer and unreacted silicon-bonded OH or alkoxy groups carried by the residue of the polysiloxane in the condensate; and
   (2) an aminoplast resin providing basic methylol groups.

2. A thermosetting coating composition as recited in claim 1 in which said condensate and said aminoplast resin are present in weight proportions of from 40–95 parts by weight of said condensate to 60–5 parts by weight of said aminoplast resin.

3. A thermosetting coating composition as recited in claim 1 in which said polysiloxane contains from 2–8 silicon-bonded OH or alkoxy groups per molecule.

4. A thermosetting coating composition as recited in claim 1 in which said polysiloxane is an organopolysiloxane having the following unit formula:

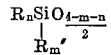

where R is a monovalent hydrocarbon radical, R' is selected from the group consisting of alkoxy radicals and the hydroxyl radical, $n$ has an average value of 1 to 2, and $m$ has an average value of at least 0.1, the sum of $m$ and $n$ being no more than 3, there being an average of at least 1.2 R' groups present per organopolysiloxane molecule.

5. A thermosetting coating composition as recited in claim 4 in which $m$ has an average value of from 0.5–1.1 and there are from 2–8 R' groups per molecule.

6. A thermosetting coating composition comprising an organic solvent having dissolved therein:

(1) from 40–95 parts by weight of a non-gelled condensate of a copolymer of from 5–15%, based on the weight of the copolymer, of aliphatic monoethylenically unsaturated monomer carrying the hydroxy group selected from the group consisting of hydroxy alkyl esters of monoethylenically unsaturated carboxylic acids, polyhydric alcohol allyl and methallyl ether, allyl and methallyl alcohols, 2-hydroxy-methyl-5-norbornene and unsaturated fatty alcohols corresponding to drying oil fatty acids, the balance of the copolymer consisting essentially of at least one monomer containing the

group with the hydroxy group provided by said monomer carrying the hydroxy group being essentially the only functional group in the copolymer, the sole exception being that said balance of the copolymer is of up to 5% by weight of monoethylenically unsaturated carboxylic acid, with an organopolysiloxane having the following unit formula:

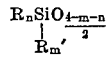

where R is a monovalent hydrocarbon radical, R' is selected from the group consisting of alkoxy radicals and the hydroxyl radical, $n$ has an average value of 1 to 2, and $m$ has an average value of at least 0.1, the sum of $m$ and $n$ being no more than 3, there being an average of at least 1.2 R' groups present per organopolysiloxane molecule; the equivalent ratio of hydroxy groups in said copolymer to silicon-bonded OH or alkoxy groups in said material being from 2.5:1 to 1:2.5, said condensation being continued to eliminate from 10–90% of the water or alcohol of reaction from the silicon-bonded OH or alkoxy groups in said polysiloxane to cause the bulk of said polysiloxane to become chemically combined with said copolymer and form a non-gelled condensate providing unreacted hydroxy groups in the copolymer and unreacted silicon-bonded OH or alkoxy groups carried by the residue of the polysiloxane in the condensate; and (2) from 60–5 parts by weight of a solvent-soluble heat-hardening condensate of a triazine with excess formaldehyde providing basic methylol groups.

7. A thermosetting coating composition as recited in claim 6 in which said condensate is present in said organic solvent in an amount of from 30–65% by weight and said condensate is advanced close to the point of gelation.

8. A thermosetting coating composition as recited in claim 7 in which the major weight proportion of said organic solvent is constituted by aromatic hydrocarbon solvents.

9. A thermosetting coating composition as recited in claim 6 in which said condensation is continued to condense an average of at least one silicon-bonded OH or alkoxy group per molecule of polysiloxane.

10. A thermosetting coating composition as recited in claim 1 in which said monomer carrying the hydroxy group is an hydroxy alkyl acrylate or methacrylate.

11. A thermosetting coating composition as recited in claim 6 in which the monomer carrying the hydroxy group is an hydroxy alkyl ester of a monocarboxylic acid.

12. A thermosetting coating composition as recited in claim 6 in which the monomer carrying the hydroxy group is hydroxyethyl acrylate.

References Cited

UNITED STATES PATENTS 3,261,881  7/1966  Christenson et al. _____ 260—826
3,318,971  5/1967  Chloupek et al. _____ 260—826

SAMUEL H. BLECH, Primary Examiner

U.S. Cl. X.R.

117—123, 132, 148, 161; 260—31.2, 32.8, 33.2, 33.4, 41, 78.3, 826, 827